Oct. 17, 1961     H. G. VERNER ET AL     3,004,835

METHOD OF PREPARING SILICON RODS

Filed Nov. 20, 1958

Harry Grey Verner,
John R. Kuebler,
Inventors.
Koenig and Pope,
Attorneys.

3,004,835
METHOD OF PREPARING SILICON RODS

Harry Grey Verner, Kirkwood, and John R. Kuebler, Jr., Northwoods, Mo., assignors to Mallinckrodt Chemical Works, St. Louis, Mo., a corporation of Missouri
Filed Nov. 20, 1958, Ser. No. 775,253
3 Claims. (Cl. 156—3)

The present invention is directed to silicon production, and more particularly to methods for producing silicon in the form of zone-refinable rods without melting the silicon in contact with a foreign material.

Briefly the present invention comprises a method of preparing pure silicon in rod form which is suitable for use in a conventional zone melting apparatus without further fabrication. The method comprises depositing silicon in rod form on a tantalum filament by conventional methods and removing the silicon deposit from the deposition chamber intact and with the tantalum filament still embedded in it. This rod is then preferentially leached along the boundary between the silicon and tantalum with hot aqueous hydrofluoric acid to dissolve at least partially the tantalum core and enable its removal without substantially fracturing the silicon, thereby leaving a rod of silicon with a hollow core throughout its length of substantially the same diameter as that of the tantalum filament. The leached silicon rod is next etched with nitric acid containing a minor proportion of hydrofluoric acid to remove surface impurities remaining after removal of the tantalum core, and finally rinsed and dried.

It is known to deposit elemental silicon on a heated tantalum filament by thermal decomposition or chemical reduction of a silicon halide or silane. The silicon deposit is then removed from the filament in various ways, most commonly by breaking the brittle deposit into fragments as by striking it sharply with a hammer or other blunt instrument. It has also been proposed to fragment the deposit by cooling the filament after a predetermined thickness of deposit has formed whereby, because of differences in the thermal coefficients of expansion of silicon and tantalum, the deposit is caused to rupture spontaneously and drop off the filament. In either case the silicon it ultimately recovered in the form of broken fragments of varying size.

It is also known to form silicon, obtained in the above manner or by other methods, in the form of elongated rods which are of convenient size and form to be used in a zone melting apparatus, there to be further refined and converted to single-crystalline form for use in rectifiers, transistors, and the like. For this the silicon fragments are usually melted in a suitable crucible, e.g. a quartz crucible, and cast in a mold of quartz or chilled copper. The usefulness of these methods is limited by the propensity of molten silicon to absorb impurities from other materials.

To obtain elemental silicon in rod form without melting it in contact with a foreign material, it has also been proposed to deposit silicon directly from the gas phase on a solid or partially molten silicon carrier in such a manner that a solid rod of silicon free from any other substances results. To carry out such a process successfully, however, requires more elaborate apparatus and more delicate control of the reaction conditions than deposition on a tantalum filament and it is doubtful if the resulting silicon is of sufficiently greater intrinsic purity to justify the additional effort and difficulty.

Among the objects of the present invention are the provision of methods for recovering silicon in rod form from the well known process of chemically decomposing a silicon compound, thermally or by chemical reduction, in which the liberated elemental silicon is deposited on a heated tantalum filament; the provision of methods of the character described which do not require melting the silicon in contact with a foreign crucible or mold material; the provision of methods of the character described which enable recovery of the silicon deposit in rod form suitable for zone melting procedures using simple and readily available equipment; and the provision of methods for obtaining pure silicon in rod form which are simpler and more economical than the methods available heretofore. Other objects and features will be in part apparent and in part pointed out hereinafter.

The invention accordingly comprises the methods hereinafter described, the scope of the invention being indicated in the following claims.

In the accompanying drawings, in which several of various possible embodiments of the invention are illustrated, FIG. 1 is an elevation of a rod, partly in section, illustrating one embodiment of the present invention;

Corresponding reference characters indicate corresponding parts throughout the several views of the drawings.

Figure 2:
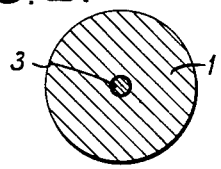
FIG. 2 is a section taken on line 2—2 on FIG. 1.
Figure 1:
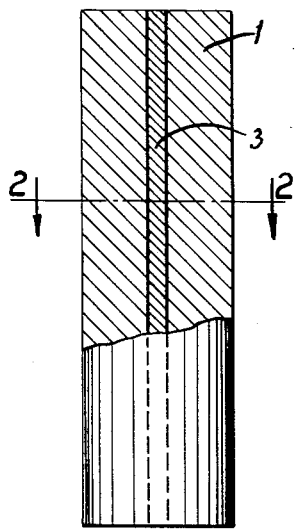

In accordance with the present invention, silicon is deposited on a tantalum filament in a conventional manner. A substantially straight filament should be used in this case rather than the sometimes employed helical filament. After deposition is complete, the rod-shaped deposit is removed from the deposition chamber with the tantalum filament still embedded in it. Referring to FIGS. 1 and 2, 1 is a silicon deposit surrounding a tantalum core 3 which formed part of the filament used during the deposition reaction. The deposit containing the core is then immersed in hot aqueous hydrofluoric acid for a sufficient length of time to dissolve at least a substantial part of the tantalum core. It has been found that the hot acid penetrates the rod along the boundary between the silicon and the tantalum, thereby reducing the diameter of the tantalum along its entire length so that it is not necessary to dissolve the tanalum completely in order to permit its withdrawal without fracturing the silicon deposit.

The surface layer of the now hollow silicon rod which was in contact with the tantalum filament characteristically contains a trace of tantalum silicide or other chemically bound tantalum, formed during the deposition, which is insoluble in hydrofluoric acid. These traces of tantalum must be removed to obtain a silicon rod of maximum purity. It has been found that this chemically combined tantalum along with any other surface impurities remaining after removal of the tantalum core can be removed by etching the silicon with nitric acid containing a minor proportion, e.g., 1–10% by volume, of hydrofluoric acid. Since the foreign elements are primarily on the inner surface of the hollow silicon rod, it is advantageous to carry out the etching treatment in part by forcing the etching solution through the hollow core of the rod, as by adding the acid mixture to the top of the rod while it is supported in a vertical position and allowing it to flow through the core and drain out the bottom. By repeating the etching treatment several times using fresh acid mixture, it has been found that substantially all of the tantalum and any other foreign elements which may have been present on the surface of the silicon deposit initially, are removed. After thoroughly rinsing the rod to remove all traces of the etch solution and then drying the rod, a zone-refinable rod of silicon is obtained which is of a purity comparable to that of the freshly deposited silicon and of substantially greater purity than silicon which has been melted one or more times in contact with quartz or other crucible materials.

Figure 4:
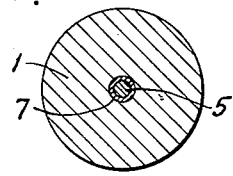
Figure 3:
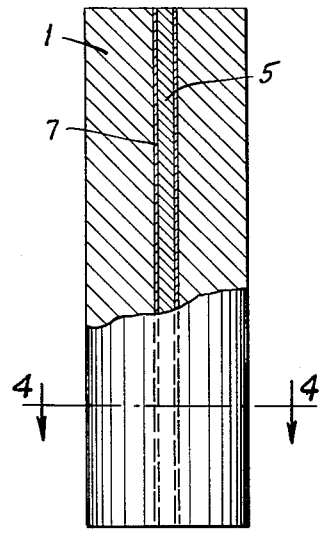
FIG. 3 is an elevation, partly in section, illustrating a variant of the invention; and, FIG. 4 is a section taken on line 4—4 on FIG. 3.

The tantalum filament may be either a solid wire or rod or it may be a hollow tube. In a special modification of the invention, the tantalum filament is made in two parts. Referring to FIGS. 3 and 4, around a core consisting of a solid wire or rod of tantalum 5 is slipped a thin-walled tantalum tube 7 having an internal diameter such that it fits closely but removably around the solid core. The wire and tube form a filament on the outer surface of which silicon 1 is deposited (on the surface of the tantalum tube) in the usual manner. Thereafter the solid tantalum core is withdrawn from its surrounding tantalum sleeve. Not only does this mode of operation reduce the amount of tantalum which is consumed, but the relatively thin tantalum sleeve is more easily and quickly leached from the silicon than a solid tantalum core. The subsequent etching and cleaning of the rod is then carried out as before.

From the foregoing description it will be evident that the present invention is independent of the method by which the silicon deposit is formed on the tantalum core. It may for example be formed by the well-known thermal decomposition of a silicon halide or silane, or by hydrogen reduction of a halogenated silane, such as trichlorosilane, or by any of the other methods known to the art.

Many other variations of the present invention will be apparent to those skilled in the art.

The following examples illustrate the invention.

*Example 1*

A 4-in. length of silicon deposit having a diameter of approximately 5/8 in., as obtained from a tantalum filament decomposer, with the filament still in place, was converted to a zone-refinable rod of pure silicon in the following manner. The rod was first immersed for sixten hours in 48% hydrofluoric acid at a temperature of approximately 90° C. to leach out the tantalum metal core. Even if the tantalum core is still not completely dissolved, it is so reduced in diameter by the action of the hydrofluoric acid that it can easily be removed by grasping it with a tweezers and pulling it out. The resulting silicon rod was a hollow cylinder having an internal diameter of approximately 19/64 inch and its external diameter substantially unchanged from the original deposit. The leached rod was then etched as follows. First, 200 ml. of a 95/5 (parts per volume) mixture of 70% nitric acid and 48% hydrofluoric acid (acids of these concentrations were used throughout this and the following examples) was twice forced by gravity through the hollow core of the rod. This insures a clear passage through the core of the rod. Then, after adding an additional 5 ml. of hydrofluoric acid to the etch solution, the entire rod was immersed in it for two hours. Finally the rod was immersed for 30 minutes in a fresh 97/3 nitric acid-hydrofluoric acid mixture. Standard polyethylene vessels were used throughout as containers for the leaching and etching solutions. All traces of the etching solution were removed from the rod by the following washing procedure: the rod was immersed in distilled water at room temperature, agitated and allowed to drain dry; this was repeated nine times using fresh portions of distilled water; next the rod was washed ten times with deionized water in a similar manner; finally it was washed eight times by covering it with deionized water and boiling the water for about 5 minutes, then allowing the rod to drain. After drying in vacuo at 105° C. the rod was ready for zone melting. The yield of pure silicon in rod form was 81.5% of the original deposit.

*Example 2*

A tantalum-containing silicon rod was subjected to a hydrofluoric acid leach as described in Example 1. A modified procedure was then used to etch the resulting hollow silicon cylinder. First it was immersed for 48 hours in a 93/7 (parts per volume) nitric acid-hydrofluoric acid mixture at room temperature. Following this, 200 ml. of a fresh 95/5 nitric acid-hydrofluoric acid mixture was twice forced through the hollow core, after which the entire rod was immersed in this etch solution for 2 hours. Finally it was immersed in a fresh 97.5/2.5 nitric acid-hydrofluoric acid mixture for 30 minutes. The leached and etched rod was washed ten times with distilled water and ten times with deionized water as described in Example 1, after which it was washed an additional six times with deionized water in an ultrasonic cleaner. After drying in vacuo at 105° C. the rod was ready for zone melting. The yield of pure silicon in rod form by this procedure was 82.9% of the original deposit.

*Example 3*

The procedure of Example 2 was repeated except for the washing procedure. In this case the rod was washed seven times in boiling deionized water and then dried in vacuo at 105° C. The yield of pure silicon was 85.4% of the original deposit.

*Example 4*

A ten-inch length of silicon deposit with the tantalum filament still in place was immersed overnight in 48% hydrofluoric acid at 90° C. It was rinsed with water and then immersed in a 95/5 (parts per volume) nitric acid-hydrofluoric acid mixture for 15 minutes and then in a fresh mixture of the same strength for an equal length of time. Next, 250 ml. of a fresh 95/5 nitric acid-hydrofluoric acid mixture was forced by gravity through the hollow core of the silicon rod. After adding 5 ml. of 48% hydrofluoric acid to the etch solution, the step was repeated. Finally the entire rod was immersed in a 98/2 nitric acid-hydrofluoric acid mixture for two hours. The leached and etched rod was washed ten times with distilled water and ten times with deionized water at room temperature and then three times with boiling deionized water. After drying the rod in vacuo at 105–110° C. it was ready for zone-melting. It was determined that the weight of the rod was diminished by about 5% during the etch treatments and that the hollow core was enlarged from a diameter of 19/64 inch to slightly greater than 12/64 inch.

The hollow core of the rod is obliterated during the first passage of a molten zone through the rod. Not only is the hollow core not disadvantageous, but in cases where it is desired to convert the rod to silicon of predetermined type and resistivity, the core offers a convenient cavity for introducing conductivity-type-determining impurities which are there distributed throughout the rod during the zone-melting process.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

We claim:

1. The method of preparing substantially pure silicon which comprises forming a deposit of silicon on a tantalum core, then preferentially leaching the tantalum along the boundary between the silicon and tantalum with hot aqueous hydrofluoric acid to dissolve at least part of the tantalum and enable its removal without substantially fracturing the silicon, and etching the silicon to remove impurities.

2. The method of producing silicon in the form of zone-refinable rods which comprises depositing silicon on a tantalum filament, leaching the deposit together with the embedded filament in hot aqueous hydrofluoric acid to dissolve a substantial portion of the tantalum filament and enable its removal, etching the resulting rod of silicon, from which the tantalum has been removed, in nitric acid containing a minor proportion of hydrofluoric acid, and then rinsing and drying the resulting zone-refinable rod of pure silicon.

3. The method of producing silicon in the form of zone-refinable rods which comprises depositing silicon on a tantalum filament, leaching the deposit together with the embedded filament in hot aqueous hydrofluoric acid to dissolve a substantial portion of the tantalum filament and enable its removal, etching the resulting rod of silicon, from which the tantalum has been removed, in nitric acid containing approximately 1–10% by volume of hydrofluoric acid, and then rinsing and drying the resulting zone-refinable rod of pure silicon.

References Cited in the file of this patent

UNITED STATES PATENTS

| | | |
|---|---|---|
| 1,386,227 | Becket | Aug. 2, 1921 |
| 2,419,966 | Ransley et al. | May 6, 1947 |
| 2,469,418 | Striplin | May 10, 1949 |
| 2,885,364 | Swartz | May 5, 1959 |
| 2,930,722 | Ligenza | Mar. 29, 1960 |

OTHER REFERENCES

Szekely: Journal of the Electrochemical Society, vol. 104, No. 11, November 1957, pages 663–667.

Litton et al.: Journal of the Electrochemical Society, vol. 101, No. 6. June 1954, pages 287–292.

Theuerer: article in "Bell Laboratories Record," vol. 33, 1955, pages 327–330.

UNITED STATES PATENT OFFICE
CERTIFICATION OF CORRECTION

Patent No. 3,004,835                                October 17, 1961

Harry Grey Verner et al.

It is hereby certified that error appears in the above numbered patent requiring correction and that the said Letters Patent should read as corrected below.

Column 1, line 44, for "it" read -- is --; column 2, line 32, after "rod-shaped" insert -- silicon --; column 3, lines 37 and 38, for "sixten" read -- sixteen --.

Signed and sealed this 3rd day of April 1962.

(SEAL)
Attest:

ERNEST W. SWIDER                                    DAVID L. LADD
Attesting Officer                                       Commissioner of Patents